(12) United States Patent
Zhao et al.

(10) Patent No.: US 11,531,238 B2
(45) Date of Patent: Dec. 20, 2022

(54) LIQUID CRYSTAL LENS, LIQUID CRYSTAL DEVICE AND METHOD FOR DRIVING LIQUID CRYSTAL LENS

(71) Applicants: BEIJING BOE DISPLAY TECHNOLOGY CO., LTD., Beijing (CN); BOE TECHNOLOGY GROUP CO., LTD., Beijing (CN)

(72) Inventors: Wenqing Zhao, Beijing (CN); Qian Wang, Beijing (CN); Haiyan Wang, Beijing (CN); Weili Zhao, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/218,305

(22) Filed: Mar. 31, 2021

(65) Prior Publication Data

US 2021/0349359 A1   Nov. 11, 2021

(30) Foreign Application Priority Data

May 9, 2020   (CN) .......................... 202010389067.4

(51) Int. Cl.
| | | |
|---|---|---|
| G02F 1/1343 | (2006.01) | |
| G02F 1/133 | (2006.01) | |
| G02F 1/1333 | (2006.01) | |
| G02F 1/1337 | (2006.01) | |

(52) U.S. Cl.
CPC ...... *G02F 1/134309* (2013.01); *G02F 1/1337* (2013.01); *G02F 1/13306* (2013.01); *G02F 1/13439* (2013.01); *G02F 1/133345* (2013.01); *G02F 2201/122* (2013.01)

(58) Field of Classification Search
None
See application file for complete search history.

(56) References Cited

U.S. PATENT DOCUMENTS

| | | | | |
|---|---|---|---|---|
| 9,201,285 B2 * | 12/2015 | Galstian | ............... | G02B 27/646 |
| 2008/0151168 A1 * | 6/2008 | Sekiguchi | ............... | G02B 3/14 349/142 |

(Continued)

*Primary Examiner* — Ryan Crockett
(74) *Attorney, Agent, or Firm* — Fay Sharpe LLP

(57) ABSTRACT

A liquid crystal lens includes a first substrate and a second substrate opposite to each other, and a liquid crystal layer disposed between the first substrate and the second substrate. The first substrate includes a first base substrate, a plurality of first electrodes, and a first alignment layer, wherein two adjacent first electrodes of the plurality of first electrodes are insulated from each other, an orthographic projection of each of the plurality of first electrodes on a first surface is an axisymmetric pattern and a centrosymmetric pattern, and center points of the orthographic projections of the plurality of first electrodes on the first surface are in coincidence with each other. The second substrate includes a second base substrate, a plurality of second electrodes, and a second alignment layer, wherein an orientation of the first alignment layer and an orientation of the second alignment layer are perpendicular to each other.

20 Claims, 7 Drawing Sheets

(56) References Cited

U.S. PATENT DOCUMENTS

| | | | |
|---|---|---|---|
| 2008/0212007 A1* | 9/2008 | Meredith | G02F 1/292 349/139 |
| 2012/0120333 A1* | 5/2012 | Chen | G02F 1/134363 349/33 |
| 2015/0070607 A1* | 3/2015 | Usukura | G02B 3/0081 349/15 |
| 2016/0124233 A1* | 5/2016 | Wei | H04N 13/315 349/126 |
| 2018/0356704 A1* | 12/2018 | Tabirian | A61F 2/1627 |
| 2019/0346718 A1* | 11/2019 | Liu | G02F 1/134309 |
| 2021/0349359 A1* | 11/2021 | Zhao | G02F 1/133753 |

\* cited by examiner

LIQUID CRYSTAL LENS, LIQUID CRYSTAL DEVICE AND METHOD FOR DRIVING LIQUID CRYSTAL LENS

CROSS-REFERENCE TO RELATED APPLICATION

This application claims priority to Chinese Patent Application No. 202010389067.4, filed on May 9, 2020 and entitled "LIQUID CRYSTAL LENS, LIQUID CRYSTAL DEVICE AND METHOD FOR DRIVING LIQUID CRYSTAL LENS", the entire contents of which are incorporated herein by reference.

TECHNICAL FIELD

The present disclosure relates to the field of display technologies, and more particularly, to a liquid crystal lens, a liquid crystal device, and a method for driving the liquid crystal lens.

BACKGROUND

The traditional liquid crystal lens having a single-cell structure is only capable of modulating polarized light in a single polarization direction, but incapable of modulating the polarized light in another direction.

Natural light includes two types of polarized light whose polarization directions are perpendicular to each other. For modulation of the natural light, a liquid crystal lens capable of modulating polarized light in two polarization directions is required. In the related art, a liquid crystal lens having a double-cell structure is proposed. The liquid crystal lens having the double-cell structure is formed by stacking two liquid crystal lenses each having a single-cell structure, wherein the orientations of the two liquid crystal lenses each having the single cell structure are perpendicular to each other.

SUMMARY

Embodiments of the present disclosure provide a liquid crystal lens, a liquid crystal device, and a method for driving the liquid crystal lens.

In a first aspect, the embodiments of the present disclosure provide a liquid crystal lens. The liquid crystal lens includes a first substrate and a second substrate which are opposite to each other, and a liquid crystal layer disposed between the first substrate and the second substrate, wherein the first substrate includes a first base substrate, a plurality of first electrodes disposed on a side of the first base substrate proximal to the second substrate, and a first alignment layer disposed on a side of the first electrodes distal from the first base substrate, wherein two adjacent first electrodes of the plurality of first electrodes are insulated from each other, an orthographic projection of each of the plurality of first electrodes on a first surface is an axisymmetric pattern and a centrosymmetric pattern, and center points of the orthographic projections of the plurality of first electrodes on the first surface are in coincidence with each other, the first surface being a surface, facing the second substrate, of the first substrate; and the second substrate includes a second base substrate, a second electrode disposed on a side of the second base substrate proximal to the first substrate, and a second alignment layer disposed on a side of the second electrode distal from the second base substrate, wherein an orientation of the first alignment layer and an orientation of the second alignment layer are perpendicular to each other.

In some embodiments, the plurality of first electrodes are disposed in the same layer.

In some embodiments, a gap is present between the orthographic projections of the two adjacent first electrodes on the first surface.

In some embodiments, the plurality of first electrodes are distributed in two different layers, and the two adjacent first electrodes are disposed in the two layers respectively.

In some embodiments, the first substrate further includes an insulating layer disposed between the two layers where the plurality of first electrodes are distributed.

In some embodiments, an outer boundary of the orthographic projection of one of the two adjacent first electrodes on the first surface is a first outer boundary, and an inner boundary of the orthographic projection of the other of the two adjacent first electrodes on the first surface is a first inner boundary, the first outer boundary being in coincidence with the first inner boundary.

In some embodiments, an outer boundary of an orthographic projection of the first electrode disposed on the outermost side on the first surface is in coincidence with an outer boundary of an orthographic projection of the second electrode on the first surface.

In some embodiments, an orthographic projection of the second electrode on the first surface is in the shape of a first circle; the first electrodes include a central electrode, and a plurality of peripheral electrodes surrounding the central electrode; an orthographic projection of the central electrode on the first surface is in the shape of a second circle; and orthographic projections of the plurality of peripheral electrodes on the first surface are respectively in the shape of a circular ring concentric with the second circle.

In some embodiments, an orthographic projection of the second electrode on the first surface is in the shape of a first regular polygon; the first electrodes include a central electrode, and a plurality of peripheral electrodes surrounding the central electrode; an orthographic projection of the central electrode on the first surface is in the shape of a second regular polygon; and orthographic projections of the peripheral electrodes on the first surface are respectively in the shape of a regular polygon ring concentric with the second circle, wherein the number of sides of the second regular polygon is not less than 500.

In some embodiments, the liquid crystal lens is a Fresnel lens.

In some embodiments, the liquid crystal lens is a ball lens.

In some embodiments, liquid crystals in the liquid crystal layer are nematic liquid crystals.

In some embodiments, the first electrode is an indium tin oxide electrode, and the second electrode is an indium tin oxide electrode.

In a second aspect, the embodiments of the present disclosure provide a liquid crystal device. The liquid crystal device includes a liquid crystal lens, the liquid crystal lens including a first substrate and a second substrate which are opposite to each other, and a liquid crystal layer disposed between the first substrate and the second substrate;

the first substrate includes a first base substrate, a plurality of first electrodes disposed on a side of the first base substrate proximal to the second substrate, and a first alignment layer disposed on a side of the first electrodes distal from the first base substrate, wherein two adjacent first electrodes of the plurality of first electrodes are insulated from each other, an orthographic projection of each of the plurality of first electrodes on a first surface is an axisymmetric pattern and a centrosymmetric pattern, and center points of the orthographic projections of the plurality of first electrodes on the first surface are in coincidence with each other, the first surface being a surface, facing the second substrate, of the first substrate;

the second substrate includes a second base substrate, a second electrode disposed on a side of the second base substrate proximal to the first substrate, and a second alignment layer disposed on a side of the second electrode distal from the second base substrate, wherein an orientation of the first alignment layer and an orientation of the second alignment layer are perpendicular to each other.

In some embodiments, an orthographic projection of the second electrode on the first surface is in the shape of a first circle; the first electrodes include a central electrode, and a plurality of peripheral electrodes surrounding the central electrode; an orthographic projection of the central electrode on the first surface is in the shape of a second circle; and orthographic projections of the plurality of peripheral electrodes on the first surface are respectively in the shape of a circular ring concentric with the second circle.

In some embodiments, an orthographic projection of the second electrode on the first surface is in the shape of a first regular polygon; the first electrodes include a central electrode, and a plurality of peripheral electrodes surrounding the central electrode; an orthographic projection of the central electrode on the first surface is in the shape of a second regular polygon; orthographic projections of the peripheral electrodes on the first surface are respectively in the shape of a regular polygon ring concentric with the second regular polygon; the number of sides of the second regular polygon is not less than 500.

In a third aspect, the embodiments of the present disclosure provide a method for driving a liquid crystal lens, wherein the liquid crystal lens includes a first substrate and a second substrate which are opposite to each other, and a liquid crystal layer disposed between the first substrate and the second substrate; the first substrate includes a first base substrate, a plurality of first electrodes disposed on a side of the first base substrate proximal to the second substrate, and a first alignment layer disposed on a side of the first electrodes distal from the first base substrate, wherein two adjacent first electrodes of the plurality of first electrodes are insulated from each other, an orthographic projection of each of the plurality of first electrodes on a first surface is an axisymmetric pattern and a centrosymmetric pattern, and center points of the orthographic projections of the plurality of first electrodes on the first surface are in coincidence with each other, the first surface being a surface, facing the second substrate, of the first substrate; the second substrate includes a second base substrate, a second electrode disposed on a side of the second base substrate proximal to the first substrate, and a second alignment layer disposed on a side of the second electrode distal from the second base substrate, wherein an orientation of the first alignment layer and an orientation of the second alignment layer are perpendicular to each other.

The method includes:

categorizing the plurality of first electrodes into odd-numbered electrodes and even-numbered electrodes in a direction pointing to surroundings from the center, by taking the first electrode disposed at the center as an odd-numbered electrode, the odd-numbered electrodes and the even-numbered electrodes being alternately arranged one after another;

supplying a first threshold voltage to the first electrodes and a common voltage to the second electrode when the liquid crystal lens is in a non-operating state; and supplying the first threshold voltage to the odd-numbered electrodes, a second threshold voltage to the even-numbered electrodes and a common voltage to the second electrode when the liquid crystal lens is in an operating state, the second threshold voltage being greater than the first threshold voltage.

In some embodiments, supplying the second threshold voltage to the even-numbered electrodes includes: gradually increasing the second threshold voltage supplied to the even-numbered electrodes in a direction pointing to the surroundings at the center.

In some embodiments, the liquid crystal layer includes a plurality of liquid crystal molecules, and the first threshold voltage is n times a threshold voltage for driving the liquid crystal molecules to deflect, n being a positive integer, $2 \leq n \leq 4$.

In some embodiments, the liquid crystal layer includes a plurality of liquid crystal molecules, and the second threshold voltage is m times a threshold voltage for driving the liquid crystal molecules to deflect, $4 < m \leq 10$.

Reference symbols represent the following components:
1—first substrate; 11—first base substrate; 12—first electrode; 13—first alignment layer;
2—second substrate; 21—second base substrate; 22—second electrode; 23—second alignment layer;
3—liquid crystal layer; 3a—first orientation layer; 3b—transition layer; 3c—second orientation layer;

M1—first conductive layer; M2—second conductive layer;

X—first polarization direction; Y—second polarization direction.

DETAILED DESCRIPTION

Description is made in detail to the present disclosure, examples of which are illustrated in the accompanying drawings. The reference symbols which are the same or similar throughout the accompanying drawings represent the same or similar components or components with the same or similar functions. In addition, if a detailed description of the known technology is unnecessary for the illustrated feature of the present disclosure, it will be omitted. The embodiments described below with reference to the accompanying drawings are intended to be exemplary only, and are only intended to explain the present disclosure, rather than being construed as limitations to the present disclosure.

Those skilled in the art will appreciate that all terms (including technical and scientific terms) as used herein have the same meanings as commonly understood by those of ordinary skill in the art of the present disclosure, unless otherwise defined. It also should be understood that terms such as those defined in the general dictionary should be understood to have the meanings consistent with the meanings in the context of the prior art, and will not be interpreted in an idealized or overly formal meaning unless specifically defined as herein.

It can be understood by those skilled in the art that the singular forms "a," "an," "the," "said," and "this" may also encompass plural forms, unless otherwise stated. It should be further understood that the terms "include" and "comprise" used in the description of the present disclosure means there exists a feature, an integer, a step, an operation, an element and/or a component, but could not preclude existing or adding of one or more other features, integers, steps, operations, elements, components and/or groups thereof.

Figure 1:
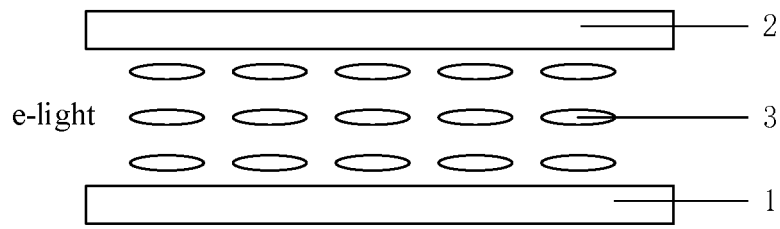
FIG. 1 is a schematic side view of a single-cell liquid crystal lens in the related art in a non-operating state.

The inventors of the present disclosure consider that the traditional liquid crystal lens having a single-cell structure can only modulate single polarized light. FIG. 1 is a schematic side view of a single-cell liquid crystal lens in the related art in a non-operating state. As shown in FIG. 1, for example, the single-cell liquid crystal lens includes a first substrate 1 and a second substrate 2 which are opposite to each other 2, and a liquid crystal layer 3 disposed between the first substrate 1 and the second substrate 2. In the single-cell liquid crystal lens shown in FIG. 1, each of the first substrate 1 and the second substrate 2 includes a driving electrode, which is driven by a driving signal to deflect liquid crystals in the liquid crystal layer 3. At this time, the single-cell liquid crystal lens can only modulate e-polarized light, but cannot modulate o-polarized light. That is, the single-cell liquid crystal lens cannot realize the modulation of natural light, which makes application scenarios of the single-cell liquid crystal lens relatively limited.

Figure 2:
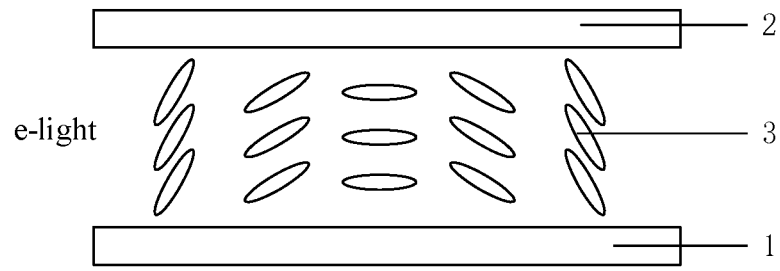
FIG. 2 is a schematic side view of a single-cell liquid crystal lens in the related art in an operating state.

FIG. 2 is a schematic side view of a single-cell liquid crystal lens in the related art in an operating state. As shown in FIG. 2, when an adaptive driving signal is supplied to the single-cell liquid crystal lens shown in FIG. 1, the liquid crystal molecules at different positions are different in rotation states, such that refractive indexes at different positions in the liquid crystal layer 3 are different, thereby presenting a corresponding lens effect.

Figure 3:
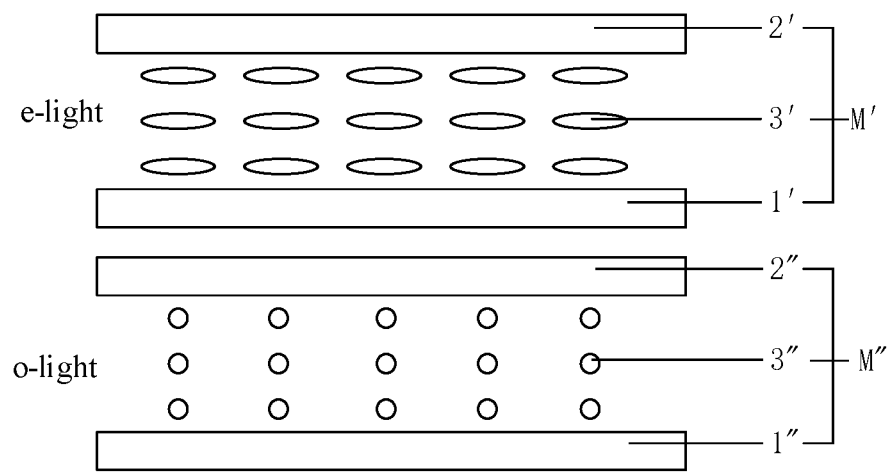
FIG. 3 is a schematic side view of a double-cell liquid crystal lens in the related art.

Natural light includes e-polarized light and o-polarized light. To modulate the natural light, it is necessary to arrange a liquid crystal lens with a double-cell structure. FIG. 3 is a schematic side view of a double-cell liquid crystal lens in the related art. As shown in FIG. 3, the liquid crystal lens having the double-cell structure includes a first liquid crystal cell M' and a second liquid crystal cell M". The first liquid crystal cell M' includes a first-cell first substrate 1' and a first-cell second substrate 2' which are opposite to each other, and a first liquid crystal layer 3' disposed between the first-cell first substrate 1' and the first-cell second substrate 2. The second liquid crystal cell M" includes a second-cell first substrate 1" and a second-cell second substrate 2" which are opposite to each other, and a second liquid crystal layer 3" disposed between the second-cell first substrate 1" and the second-cell second substrate 2". An orientation of liquid crystals in the first liquid crystal layer 3' and an orientation of liquid crystals in the second liquid crystal layer 3" are perpendicular to each other. The first liquid crystal cell M' and the second liquid crystal cell M" modulate e-polarized light and o-polarized light, respectively. However, the double-cell liquid crystal lens is relatively heavy and expensive, which also makes the application scenarios limited.

Figure 4:
FIG. 4 is a schematic top view of a liquid crystal lens according to an embodiment of the present disclosure.

FIG. 4 is a schematic top view of a liquid crystal lens according to an embodiment of the present disclosure. Referring to FIG. 4, a projection of the liquid crystal lens 100 is square. In other embodiments, a projection of the liquid crystal lens 100 may be in other shapes, such as a circle, and an ellipse.

Figure 5:
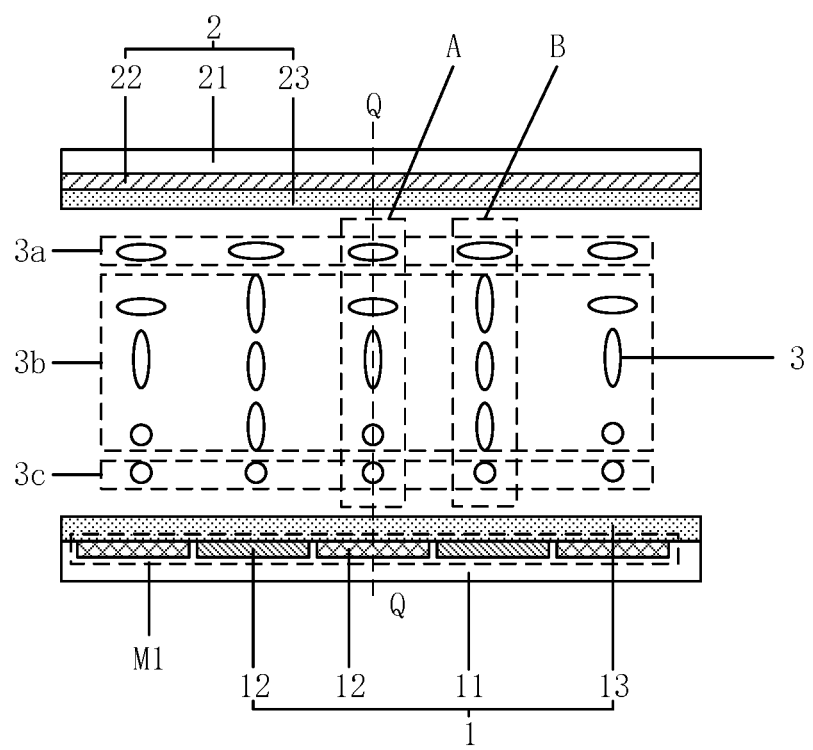
FIG. 5 is a schematic side view of a liquid crystal lens according to an embodiment of the present disclosure.

FIG. 5 is a schematic side view of a liquid crystal lens according to an embodiment of the present disclosure. As shown in FIG. 5, the liquid crystal lens includes a first substrate 1 and a second substrate 2 which are opposite to each other, and a liquid crystal layer 3 disposed between the first substrate 1 and the second substrate 2.

The first substrate 1 includes a first base substrate 11, a plurality of first electrodes 12 disposed on a side of the first base substrate 11 proximal to the second substrate 2, and a first alignment layer 13 disposed on a side of the first electrodes 12 distal from the first base substrate 11, wherein two adjacent first electrodes 12 of the plurality of first electrodes 12 are insulated from each other. An orthographic projection of each of the plurality of first electrodes 12 on a first surface is an axisymmetric pattern and a centrosymmetric pattern, and center points of the orthographic projections of the plurality of first electrodes 12 on the first surface are in coincidence with each other, the first surface being a surface, facing the second substrate, of the first substrate. The second substrate 2 includes a second base substrate 21, a second electrode 22 disposed on a side of the second base substrate 21 proximal to the first substrate 1, and a second alignment layer 23 disposed on a side of the second electrode 22 distal from the second base substrate 21. An orientation of the first alignment layer 13 and an orientation of the second alignment layer 23 are perpendicular to each other.

In the embodiment of the present disclosure, the orientation of the first alignment layer 13 and the orientation of the second alignment layer 23 are perpendicular to each other, liquid crystal molecules in the liquid crystal layer proximal to the first alignment layer 13 have a first orientation, and liquid crystal molecules in the liquid crystal layer proximal to the second alignment layer 23 have a second alignment perpendicular to the first alignment. Liquid crystals disposed in the middle of the liquid crystal layer 3 have an initial orientation, i.e., a third orientation. Then, the liquid crystal layer 3 is divided into a first orientation layer 3a, a transition layer 3b, and a second orientation layer 3c. When the liquid crystal lens is operated, an electric field force of an electric field on the liquid crystal layer 3 can be controlled by controlling a voltage of the first electrodes 12 and a voltage of the second electrode 22. In the first orientation layer 3a and the second orientation layer 3c, the liquid crystal molecules are closer to the first alignment layer 13 and the second alignment layer 23, such that the friction force of the first alignment layer 13 and the second alignment layer 23 on the liquid crystal molecules is relatively large. That is, the electric field force of the electric field on the liquid crystal molecules is smaller than the friction force of the first alignment layer 13 and the second alignment layer 23 on the liquid crystal molecules. Therefore, the liquid crystal molecules of the first orientation layer 3a and the second orientation layer 3c are anchored in a preset direction, such that e-polarized light and o-polarized light are modulated, respectively. In the transition layer 3b, liquid crystal molecules are far distal from the first alignment layer 13 and the second alignment layer 23, such that the friction force of the first alignment layer 13 and the second alignment layer 23 on the liquid crystal molecules is relatively small. That is, the electric field force of the electric field on the liquid crystal molecules is greater than the friction force of the first alignment layer 13 and the second alignment layer 23 on the liquid crystal molecules. Therefore, the liquid crystal molecules in the transition layer 3b are anchored in another preset direction. A rotation angle of the liquid crystal molecules in the transition layer 3b and a thickness of the transition layer 3b can be adjusted based on voltage levels of the first electrodes 12 and the second electrode 22, thereby achieving different modulation effects.

The liquid crystal lens according to the embodiment of the present disclosure can modulate e-polarized light and o-polarized light, that is, modulate natural light, and has a wide range of applications. In addition, the liquid crystal lens has a single-cell structure, which not only has relatively small thickness, but also has low production cost.

In the embodiment of the present disclosure, the orientation of the first alignment layer is interpreted as an extending direction of a long axis of each liquid crystal when the liquid crystal is placed on the first alignment layer.

In some other embodiments, the first electrode 12 is an indium tin oxide electrode, and the second electrode 22 is an indium tin oxide electrode. Indium tin oxide is used to form the first electrodes 12 and the second electrode 22. Under the premise of ensuring the conductivity of the first electrodes 12 and the second electrode 22, it is also guaranteed that the first electrodes 12 and the second electrode 22 have relatively high light transmission.

In some other embodiments, the liquid crystals in the liquid crystal layer 3 are nematic liquid crystals. In an exemplary embodiment, the liquid crystals in the liquid crystal layer 3 are chiral nematic liquid crystals.

In some other embodiments, the plurality of first electrodes 12 is disposed in the same layer. For example, as shown in FIG. 5, the plurality of first electrodes 12 constitute a first conductive layer M1 which is disposed between the first base substrate 11 and the first alignment layer 13.

In the embodiment of the present disclosure, a plurality of first electrodes 12 is designed in the same layer with fewer procedures, which is conducive to reduction of the production cost.

In some other embodiments, a gap is present between the orthographic projections of the two adjacent first electrodes 12 on the first surface.

In the embodiment of the present disclosure, the voltages of the two adjacent first electrodes 12 are different so as to ensure that the thicknesses of the transition layer 3b at different positions are different, thereby achieving different modulation effects. The two adjacent first electrodes 12 are spaced apart to prevent the voltage of the first electrodes 12 from being affected by electrical connection between the two adjacent first electrodes 12.

In the liquid crystal lens shown in FIG. 5, the first substrate 1 includes one conductive layer only. In other embodiments, the first substrate 1 may include two conductive layers.

In some other embodiments, the plurality of first electrodes 12 are distributed in two different layers, and two adjacent first electrodes 12 of the plurality of first electrodes 12 are disposed in the two layers, respectively. The two adjacent first electrodes 12 mean that orthographic projections of the two first electrodes 12 on the first surface are adjacent.

Figure 9:
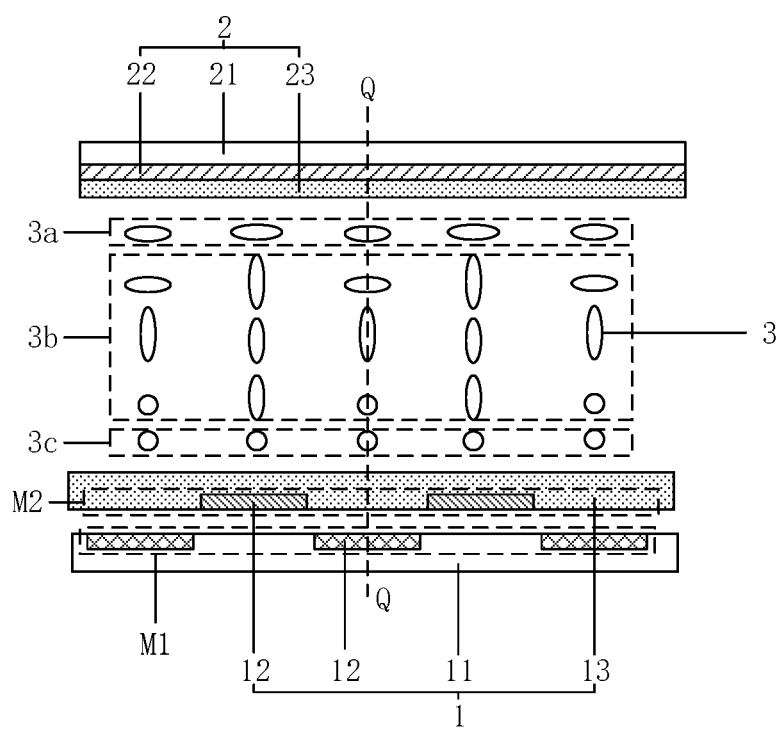
FIG. 9 is a schematic side view of another liquid crystal lens according to an embodiment of the present disclosure.

FIG. 9 is a schematic side view of another liquid crystal lens according to an embodiment of the present disclosure. As shown in FIG. 9, a plurality of first electrodes 12 constitute a conductive layer M1 and a second conductive layer M2, which are insulated from each other and are both disposed between the first base substrate 11 and the first alignment layer 13. One of the two adjacent first electrodes 12 is disposed in the first conductive layer M1, and the other of the two adjacent first electrodes 12 is disposed in the second conductive layer M2.

In the embodiment of the present disclosure, the two adjacent first electrodes 12 are arranged on the first conductive layer M1 and the second conductive layer M2, respectively; and the first conductive layer M1 and the second conductive layer M2 are insulated from each other to ensure the insulation between the two adjacent first electrodes 12.

In the embodiment of the present disclosure, the plurality of first electrodes 12 being disposed in the same layer means that the plurality of first electrodes 12 are fabricated through the same patterning process. The two adjacent first electrodes 12 being respectively disposed in different layers means that the two adjacent first electrodes 12 are fabricated through different patterning processes.

In some other embodiments, the first substrate 1 further includes an insulating layer disposed between the two layers where the plurality of first electrodes 12 are distributed. That is, the insulating layer is disposed between the first conductive layer M1 and the second conductive layer M2 to ensure that the first conductive layer M1 and the second conductive layer M2 are insulated from each other.

In some other embodiments, an outer boundary of an orthographic projection of one of the two adjacent first electrodes 11 on the first surface is a first outer boundary, and an inner boundary of an orthographic projection of the other of the two adjacent first electrodes 11 on the first surface is a first inner boundary, the first outer boundary being in coincidence with the first inner boundary.

In the embodiment of the present disclosure, since a distance between the orthographic projections of the two adjacent first electrodes 12 on the first surface is 0, an electric field formed by the plurality of first electrodes 12 is continuous. Therefore, more liquid crystal molecules in the liquid crystal layer 3 can be controlled by the electric field, so as to achieve a better modulation effect.

Figure 6:
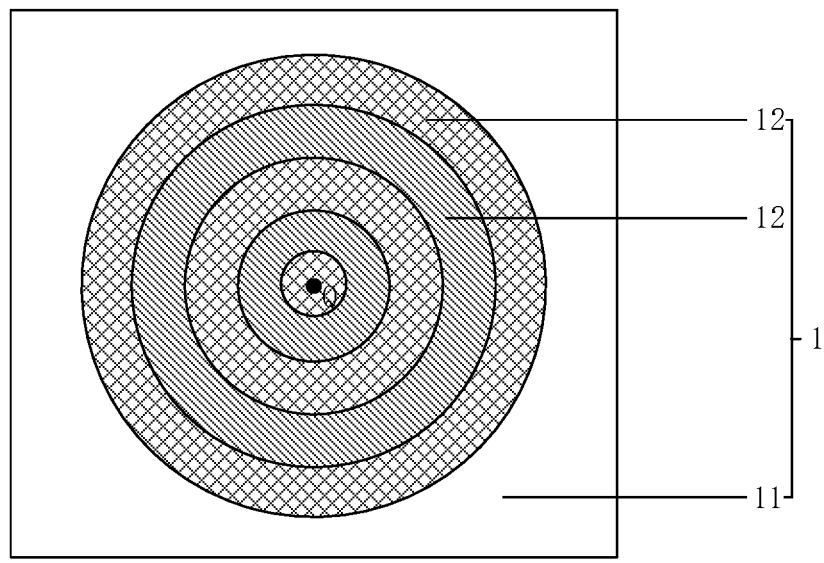
FIG. 6 is a schematic top view of a first electrode according to an embodiment of the present disclosure.

FIG. 6 is a schematic top view of a first electrode according to an embodiment of the present disclosure. As shown in FIG. 6, the first electrodes 11 include a central electrode, and a plurality of peripheral electrodes surrounding the central electrode. An orthographic projection of the central electrode on the first surface is in the shape of a second circle; and orthographic projections of the plurality of peripheral electrodes on the first surface are respectively in the shape of a circular ring concentric with the second circle.

Figure 7:
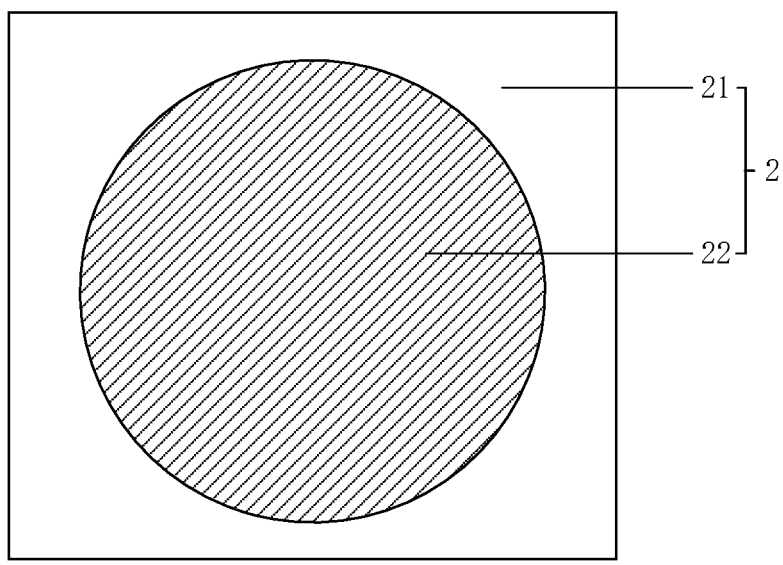
FIG. 7 is a schematic top view of a second electrode according to an embodiment of the present disclosure.

FIG. 7 is a schematic side view of a second electrode according to an embodiment of the present disclosure. As shown in FIG. 7, an orthographic projection of the second electrode 22 on the first surface is in the shape of a first circle. In the embodiment of the present disclosure, the liquid crystal lens includes a second electrode 22.

The first electrodes 12 are arranged into a structure including a central electrode and peripheral electrodes, that is, a circular ring structure, which makes the formed electric field distributed in a circular ring shape, thereby achieving a better modulation effect.

Figure 8:
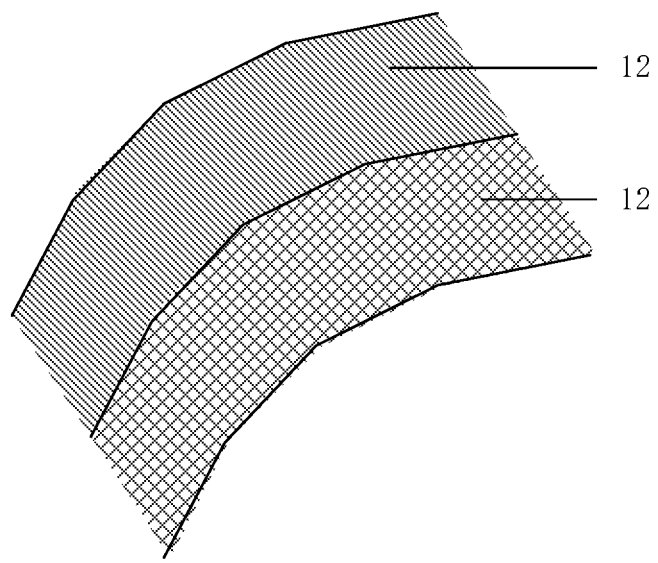
FIG. 8 is a schematic top view of another first electrode according to an embodiment of the present disclosure.

FIG. 8 is a schematic top view of another first electrode according to an embodiment of the present disclosure. As shown in FIG. 8, an orthographic projection of the central electrode on the first surface is in the shape of a second regular polygon; and orthographic projections of the peripheral electrodes on the first surface are respectively in the shape of a regular polygon ring concentric with the second regular polygon, wherein the number of sides of the second regular polygon is not less than 500. The first electrode 12 fabricated in this way is in an approximately circular or circular ring shape, such that this layout can achieve a good modulation effect, and the technological difficulty is reduced.

In some other embodiments, an outer boundary of an orthographic projection of the first electrode 12 disposed on the outermost side on the first surface is in coincidence with an outer boundary of an orthographic projection of the second electrode 22 on the first surface. By maximizing the area of the second electrode 22 relative to the first electrodes 12, more liquid crystal molecules in the liquid crystal layer 3 can be controlled by the electric field, so as to achieve a better modulation effect.

In some other embodiments, the liquid crystal lens according to the embodiment of the present disclosure is a Fresnel lens.

Figure 10:
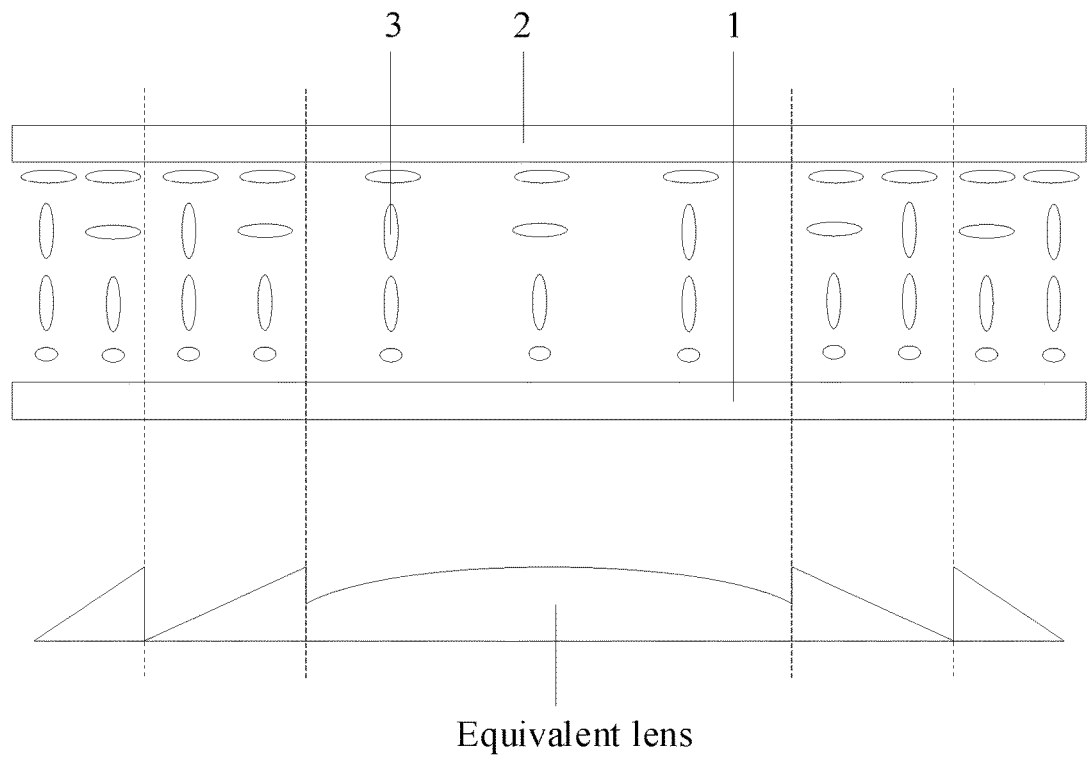
FIG. 10 is a schematic diagram of a Fresnel lens according to an embodiment of the present disclosure.

FIG. 10 is a schematic diagram of a Fresnel lens according to an embodiment of the present disclosure. As shown in FIG. 10, the liquid crystal layer 3 rotates under action of electric fields. Due to different electric fields at different positions, rotation states of the liquid crystal molecules in the liquid crystal layer 3 at different positions are different, such that refractive indexes of the liquid crystal layer 3 at different positions are different, thereby forming a lens. The following will be described in conjunction with a second-order Fresnel lens.

TABLE 1

Modulation parameter table of Fresnel lens

| Modulation direction | Region A | Region B | Step ΔRe |
|---|---|---|---|
| First polarization direction X | (2ne + no + 2no) × d | (ne + 3no + no) × d | $\lambda/2$ |
| Second polarization direction X | (2no + no + 2ne) × d | (no + 3no + ne) × d | $\lambda/2$ |

Figure 11:
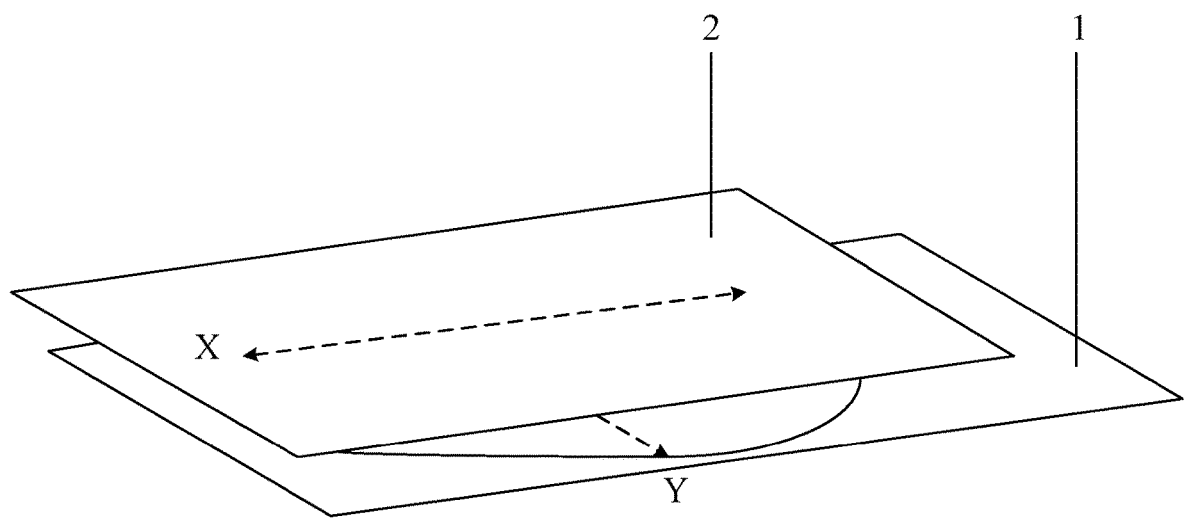
FIG. 11 is a schematic diagram of a split structure of a liquid crystal lens according to an embodiment of the present disclosure.

FIG. 11 is a schematic diagram of a split structure of a liquid crystal lens according to an embodiment of the present disclosure. Referring to FIGS. 5 and 11, an optical length of a first polarization direction X corresponding to a region A may be estimated as (2ne+no+2no)×d according to the rotation states of the liquid crystal molecules, and an optical length of a second polarization direction Y corresponding to the region A can be estimated as (2no+no+2ne)×d according to the rotation states of the liquid crystal molecules. An optical length of the first polarization direction X corresponding to a region B may be estimated as (ne+3no+no)×d according to the rotation states of the liquid crystal molecules, and an optical length of the second polarization direction Y corresponding to the region B can be estimated as (no+3no+ne)×d according to the rotation states of the liquid crystal molecules. o represents a polarization direction of o-polarized light, e represents a polarization direction of e-polarized light, and d represents a distance between the first electrode 12 and the second electrode 22.

For the second-order Fresnel lens, an optical path difference ΔRe of steps is $\lambda/2$, that is, an optical path difference of the adjacent regions A and B is $\lambda/2$. In practical use, the optical path differences at the adjacent regions A and B in the first polarization direction X and the second polarization direction Y are respectively calculated as $\lambda/2$, which is (no+3no+ne)×d.

When the liquid crystal lens is an N-order Fresnel lens, the step ΔRe is equal to (½+N)λ, that is, the optical path difference of the adjacent regions A and B is (½+N)λ, where N is an integer greater than or equal to 1. The N-order Fresnel lens can also be controlled by controlling a driving voltage controlled by a first electrode 121 and a first electrode 122.

Figure 12:
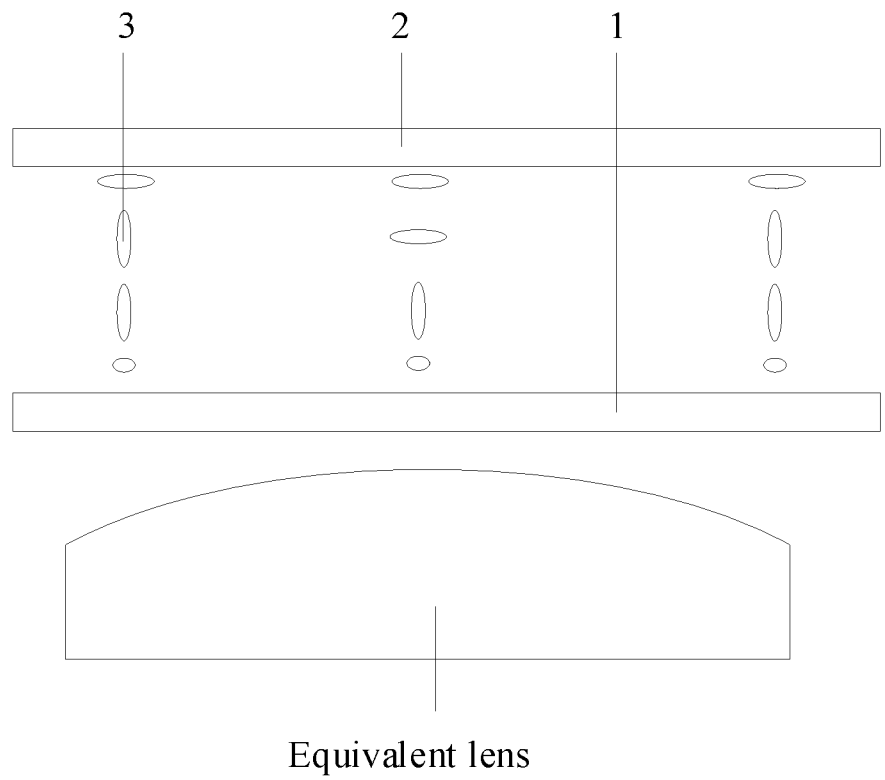
FIG. 12 is a schematic diagram of a ball lens according to an embodiment of the present disclosure.

FIG. 12 is a schematic diagram of a ball lens according to an embodiment of the present disclosure. As shown in FIG. 12, the liquid crystal lens according to the embodiment of the present disclosure is a ball lens. The liquid crystal layer 3 rotates under action of electric fields. Due to different electric fields at different positions, rotation states of the liquid crystal molecules in the liquid crystal layer 3 at different positions are different, such that refractive indexes of the liquid crystal layer 3 at different positions are different, thereby forming a lens. The optical lengths at different positions can be controlled by controlling the driving voltage controlled by the first electrode 121 and the first electrode 122.

Figure 13:
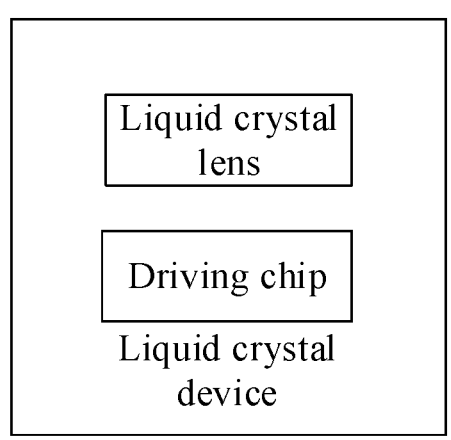
FIG. 13 is a schematic diagram of a frame structure of a liquid crystal device according to an embodiment of the present disclosure.

An embodiment of the present disclosure further provides a liquid crystal device. FIG. 13 is a schematic diagram of a frame structure of a liquid crystal device according to an embodiment of the present disclosure. As shown in FIG. 13, the liquid crystal device includes the liquid crystal lens in the above-mentioned embodiment, and has the beneficial effects of the above-mentioned liquid crystal lens, which is not repeated here.

Specifically, the liquid crystal device further includes a driving chip, which supplies a driving signal to the liquid crystal lens.

Specifically, the liquid crystal device according to the embodiment of the present disclosure may be smart liquid crystal glasses. In a specific experiment, parameters of the prepared liquid crystal glasses are tested, and the results are shown in the following table.

TABLE 2

Polarized light modulation effect parameter table of liquid crystal glasses

| Test items | First polarization direction X | Second polarization direction Y |
|---|---|---|
| 100° Panel | 98.43° | 98.52° |
| 200° Panel | 191.57° | 191.20° |
| 285° Panel | 282.49° | 281.69° |

As can be seen from the above table, the deviation of modulation effects of the liquid crystal glasses according to the embodiment of the present disclosure in a vertical polarization direction and a horizontal polarization direction is controlled at 0.3%, which meets light modulation requirements.

In addition, the liquid crystal device according to the embodiment of the present disclosure may also be considered as a 3D display, a 3D camera, a virtual reality (virtual reality, VR) product, or the like, which can all exert a better polarization modulation effect and have a wide range of applications.

An embodiment of the present disclosure further provides a method for driving a liquid crystal lens, which is applicable to driving the liquid crystal lens in the above-mentioned embodiment.

Figure 14:
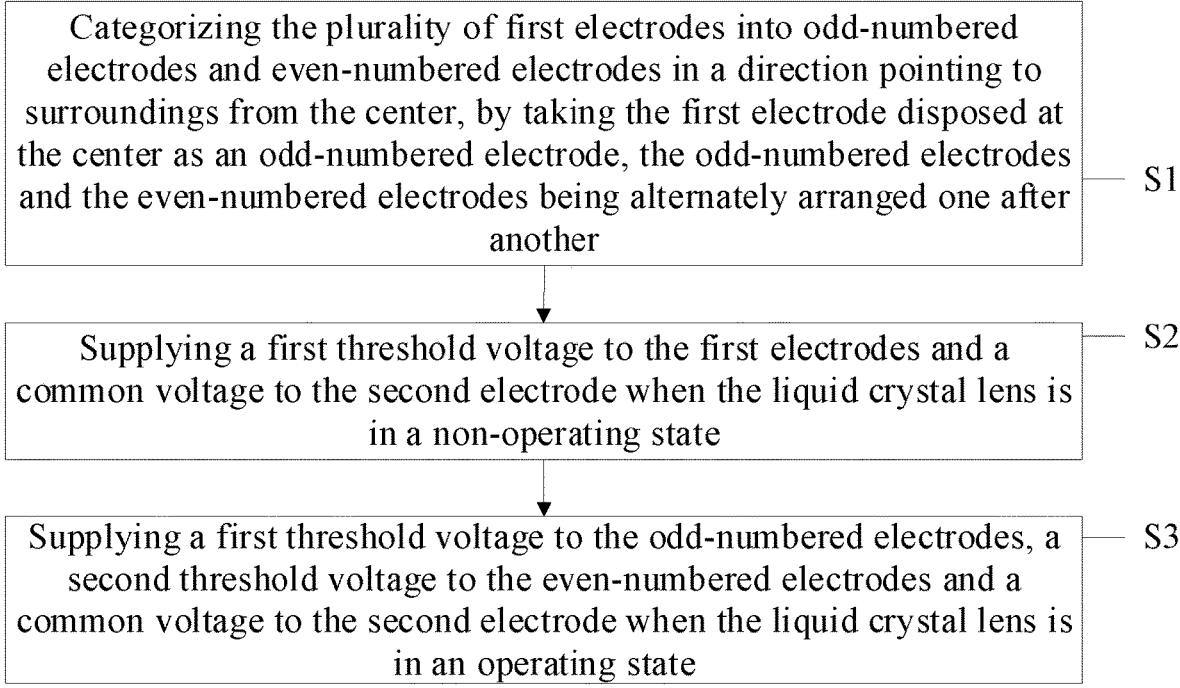
FIG. 14 is a schematic flowchart of a method for driving a liquid crystal lens according to an embodiment of the present disclosure.

FIG. 14 is a schematic flowchart of a method for driving a liquid crystal lens according to an embodiment of the present disclosure. As shown in FIG. 14, the method for driving the liquid crystal lens according to the present disclosure includes the following processes.

In S1, a plurality of first electrodes are categorized into odd-numbered electrodes and even-numbered electrodes in a direction pointing to surroundings from the center, by taking a first electrode disposed at the center as an odd-numbered electrode, the odd-numbered electrodes and the even-numbered electrodes being alternately arranged one after another.

In the embodiment of the present disclosure, the odd-numbered electrodes and the even-numbered electrodes are alternately arranged one after another, which means that one even-numbered electrode is arranged between every two odd-numbered electrodes, and one odd-numbered electrode is arranged between every two even-numbered electrodes.

In some other embodiments, as shown in FIG. 5 or FIG. 8, by taking the first electrode 12 disposed in the centermost position as a No. 1 first electrode, the first electrodes 12 are sequentially numbered in a direction pointing to surroundings from the center Q, and the first electrodes 12 are categorized into odd-numbered electrodes and even-numbered electrodes based on the numbers.

In S2, a first threshold voltage is supplied to the first electrodes and a common voltage is supplied to second electrode when the liquid crystal lens is in a non-operating state. At this time, the liquid crystal layer 3 is divided into three layers, namely a first orientation layer 3a, a transition layer 3b, and a second orientation layer 3c under action of an electric field formed by the first threshold voltage and the common voltage and under action of an alignment film.

In S3, the first threshold voltage is supplied to the odd-numbered electrodes, a second threshold voltage is supplied to the even-numbered electrodes and a common voltage is supplied to the second electrode when the liquid crystal lens is in an operating state, the second threshold voltage being greater than the first threshold voltage. In this case, due to different voltages of the first electrodes 12, liquid crystal molecules of the transition layer 3b in the liquid crystal layer 3 at different positions are subjected to different electric fields, thereby presenting different rotation states, such that the liquid crystal layer 3 has different optical path differences at different positions, thereby forming a lens.

According to the method for driving the liquid crystal lens according to the embodiment of the present disclosure, modulation of e-polarized light and modulation of o-polarized light can be achieved respectively through a single-cell structure at low production cost. In addition, the liquid crystal lens may be applied more widely.

In some embodiments, the second threshold voltage supplied to the even-numbered electrodes gradually increases in a direction pointing to the surroundings at the center.

Taking a second-order Fresnel lens as an example: a corresponding second threshold voltage is supplied to each even-numbered electrode based on the number of the even-numbered electrode, and the deflection of the liquid crystal layer 3 in a region corresponding to the odd-numbered electrodes is identical. Therefore, steps of a Fresnel lens are formed in the corresponding region.

Figure 15:
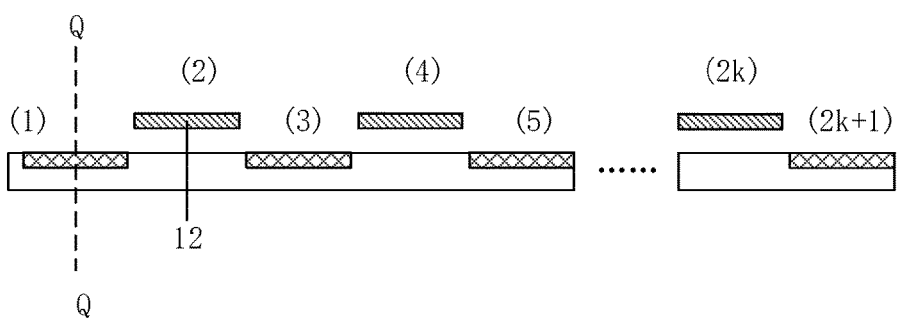
FIG. 15 is a schematic diagram of the numbering of first electrodes according to an embodiment of the present disclosure.

FIG. 15 is a schematic diagram of the numbering of a first electrode according to an embodiment of the present disclosure. As shown in FIG. 15, in the liquid crystal lens according to the embodiment of the present disclosure, the liquid crystal layer 3 includes a plurality of liquid crystal molecules, and the first threshold voltage is n times a threshold voltage for driving the liquid crystal molecules to deflect, n being a positive integer, $2 \le n \le 4$. For example, the first threshold voltage of the odd-numbered first electrodes 12 numbered (1), (3), (5) to (2k+1), and the like is 4 Vth, wherein k is a positive integer, and Vth is a threshold voltage for driving the liquid crystal molecules to deflect.

Specifically, as shown in FIG. 15, in the liquid crystal lens according to the embodiment of the present disclosure, the liquid crystal layer 3 includes a plurality of liquid crystal molecules, and the second threshold voltage is m times a threshold voltage for driving the liquid crystal molecules to deflect, $4 \le n \le 10$. The second threshold voltages of the even-numbered first electrodes 12 numbered (2), (4) to (2k), and the like is 4 Vth to 10 Vth, wherein k is a positive integer, and Vth is a threshold voltage for driving the liquid crystal molecules to deflect.

It can be understood by those skilled in the art that steps, measures and solutions in various operations, methods and processes discussed in the present disclosure may be alternated, modified, combined, or deleted. Further, other steps, measures, and solutions, with the various operations, methods and processes discussed in the present disclosure, may also be alternated, modified, rearranged, split, combined or deleted. Further, processes, measures, and solutions in the related art, with the various operations, methods and processes discussed in the present disclosure, may also be alternated, modified, rearranged, split, combined or deleted.

In the description of the present disclosure, it should be understood that the orientation or position relations indicated via terms of "central," "upper," "lower," "front," "rear," "left," "right," "vertical," "horizontal," "top," "bottom," "inner," "outer," and the like are based on orientation or the position relations shown in the drawings only to describe the present disclosure conveniently and simplify the description, but not indicate or imply that referred devices or elements must have particular orientations or be constructed and operated with the particular orientation, such that they cannot be construed as limiting of the present disclosure.

The terms "first" and "second" are only for the purpose of description and should not be construed as indicating or implying relative importance or implicitly indicating the number of technical features indicated. Thus, the features defined by the terms "first" and "second" may include one or more of the features either explicitly or implicitly. In the description of the present disclosure, unless otherwise stated, the term "a plurality of" means two or more.

In the description of the present disclosure, it should be noted that, unless otherwise definitely specified and limited, the terms "mounted," "connected with each other," and "connected to/with" need to be broadly understood, for example, connection may be fixed connection, or detachable connection or integrated connection; or may be direct connection, or indirect connection via an intermediation, or communication of inner parts of two elements. A person of ordinary skill in the art can understand the specific meaning of the above terms in the present disclosure in accordance with specific conditions.

In the description of this specification, the particular features, structures, materials, or characteristics can be integrated with any one or more embodiments or examples in a proper manner.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include a plurality of sub-steps or stages, which are not necessarily performed at the same time, but may be executed at different time. The execution order thereof is also unnecessarily performed sequentially, but may be performed in turn or alternately with at least a portion of other steps or sub-steps or stages of other steps.

Described above are merely some embodiments of the present disclosure, and it should be noted that those skilled in the art may also make several improvements and modifications without departing from the principles of the present disclosure which should be considered as the scope of protection of the present disclosure.

What is claimed is:

1. A liquid crystal lens, comprising: a first substrate and a second substrate which are opposite to each other, and a liquid crystal layer disposed between the first substrate and the second substrate; wherein
    the first substrate comprises a first base substrate, a plurality of first electrodes disposed on a side of the first base substrate proximal to the second substrate, and a first alignment layer disposed on a side of the first electrodes distal from the first base substrate, wherein two adjacent first electrodes of the plurality of first electrodes are insulated from each other, an orthographic projection of each of the plurality of first electrode on a first surface is an axisymmetric pattern and a centrosymmetric pattern, and center points of the orthographic projections of the plurality of first electrodes on the first surface are in coincidence with each other, the first surface being a surface, facing the second substrate, of the first substrate, and the plurality of first electrodes comprises odd-numbered electrodes and even-numbered electrodes, the odd-numbered electrodes and the even-numbered electrodes being alternately arranged one after another in a direction pointing to surroundings from a center and by taking the first electrode disposed at the center as an odd-numbered electrode; and
    the second substrate comprises a second base substrate, a second electrode disposed on a side of the second base substrate proximal to the first substrate, and a second alignment layer disposed on a side of the second electrode distal from the second base substrate, wherein an orientation of the first alignment layer is perpendicular to an orientation of the second alignment layer,
    wherein in a non-operating state, both the odd-numbered electrodes and even-numbered electrodes of the first electrodes are provided with a first threshold voltage and the second electrode is provided with a common voltage; and
    in an operating state, the odd-numbered electrodes are provided with the first threshold voltage, the even-numbered electrodes are provided with a second threshold voltage and the second electrode is provided with the common voltage, the second threshold voltage being greater than the first threshold voltage.

2. The liquid crystal lens according to claim 1, wherein the plurality of first electrodes are disposed in a same layer.

3. The liquid crystal lens according to claim 2, wherein a gap is defined between the orthographic projections of the two adjacent first electrodes on the first surface.

4. The liquid crystal lens according to claim 1, wherein the plurality of first electrodes are distributed in two different layers, and the two adjacent first electrodes of the plurality of first electrodes are disposed in the two layers respectively.

5. The liquid crystal lens according to claim 4, wherein the first substrate further comprises an insulating layer disposed between the two layers where the plurality of first electrodes are distributed.

6. The liquid crystal lens according to claim 5, wherein an outer boundary of the orthographic projection of one of the two adjacent first electrodes on the first surface is a first outer boundary, and an inner boundary of the orthographic projection of the other of the two adjacent first electrodes on the first surface is a first inner boundary, the first outer boundary being in coincidence with the first inner boundary.

7. The liquid crystal lens according to claim 1, wherein an outer boundary of an orthographic projection of the first electrode disposed on the outermost side on the first surface is in coincidence with an outer boundary of an orthographic projection of the second electrode on the first surface.

8. The liquid crystal lens according to claim 1, wherein an orthographic projection of the second electrode on the first surface is in the shape of a first circle; the first electrodes comprise a central electrode, and a plurality of peripheral electrodes surrounding the central electrode; an orthographic projection of the central electrode on the first surface is in the shape of a second circle; and orthographic projections of the plurality of peripheral electrodes on the first surface are respectively in the shape of a circular ring concentric with the second circle.

9. The liquid crystal lens according to claim 1, wherein an orthographic projection of the second electrode on the first surface is in the shape of a first regular polygon; the first electrodes comprise a central electrode, and a plurality of peripheral electrodes surrounding the central electrode; an orthographic projection of the central electrode on the first surface is in the shape of a second regular polygon; and orthographic projections of the peripheral electrodes on the first surface are respectively in the shape of a regular polygon ring concentric with the second regular polygon, wherein the number of sides of the second regular polygon is not less than 500.

10. The liquid crystal lens according to claim 1, wherein the liquid crystal lens is a Fresnel lens.

11. The liquid crystal lens according to claim 1, wherein the liquid crystal lens is a ball lens.

12. The liquid crystal lens according to claim 1, wherein liquid crystals in the liquid crystal layer are nematic liquid crystals.

13. The liquid crystal lens according to claim 1, wherein the first electrode is an indium tin oxide electrode, and the second electrode is an indium tin oxide electrode.

14. A liquid crystal device, comprising a liquid crystal lens, wherein
the liquid crystal lens comprises a first substrate and a second substrate which are opposite to each other, and a liquid crystal layer disposed between the first substrate and the second substrate; wherein
the first substrate comprises a first base substrate, a plurality of first electrodes disposed on a side of the first base substrate proximal to the second substrate, and a first alignment layer disposed on a side of the first electrodes distal from the first base substrate, wherein two adjacent first electrodes of the plurality of first electrodes are insulated from each other, an orthographic projection of each of the plurality of first electrodes on a first surface is an axisymmetric pattern and a centrosymmetric pattern, and center points of the orthographic projections of the plurality of first electrodes on the first surface are in coincidence with each other, the first surface being a surface, facing the second substrate, of the first substrate, and the plurality of first electrodes comprises odd-numbered electrodes and even-numbered electrodes, the odd-numbered electrodes and the even-numbered electrodes being alternately arranged one after another in a direction pointing to surroundings from a center and by taking the first electrode disposed at the center as an odd-numbered electrode; and
the second substrate comprises a second base substrate, a second electrode disposed on a side of the second base substrate proximal to the first substrate, and a second alignment layer disposed on a side of the second electrode distal from the second base substrate, wherein an orientation of the first alignment layer and an orientation of the second alignment layer are perpendicular to each other;
wherein in a non-operating state, both the odd-numbered electrodes and even-numbered electrodes of the first electrodes are provided with a first threshold voltage and the second electrode is provided with a common voltage; and
in an operating state, the odd-numbered electrodes are provided with the first threshold voltage, the even-numbered electrodes are provided with a second threshold voltage and the second electrode is provided with the common voltage, the second threshold voltage being greater than the first threshold voltage.

15. The liquid crystal device according to claim 14, wherein an orthographic projection of the second electrode on the first surface is in the shape of a first circle; the first electrodes comprise a central electrode, and a plurality of peripheral electrodes surrounding the central electrode; an orthographic projection of the central electrode on the first surface is in the shape of a second circle; and orthographic projections of the plurality of peripheral electrodes on the first surface are respectively in the shape of a circular ring concentric with the second circle.

16. The liquid crystal device according to claim 14, wherein an orthographic projection of the second electrode on the first surface is in the shape of a first regular polygon; the first electrodes comprise a central electrode, and a plurality of peripheral electrodes surrounding the central electrode; an orthographic projection of the central electrode on the first surface is in the shape of a second regular polygon; and orthographic projections of the peripheral electrodes on the first surface are respectively in the shape of a regular polygon ring concentric with the second circle, wherein the number of sides of the second regular polygon is not less than 500.

17. A method for driving a liquid crystal lens, wherein the liquid crystal lens comprises a first substrate and a second substrate which are opposite to each other, and a liquid crystal layer disposed between the first substrate and the second substrate;
the first substrate comprises a first base substrate, a plurality of first electrodes disposed on a side of the first base substrate proximal to the second substrate, and a first alignment layer disposed on a side of the first electrodes distal from the first base substrate, wherein two adjacent first electrodes of the plurality of first electrodes are insulated from each other, an orthographic projection of each of the plurality of first electrodes on a first surface is an axisymmetric pattern and a centrosymmetric pattern, and center points of the orthographic projections of the plurality of first electrodes on the first surface are in coincidence with each other, the first surface being a surface, facing the second substrate, of the first substrate;
the second substrate comprises a second base substrate, a second electrode disposed on a side of the second base substrate proximal to the first substrate, and a second alignment layer disposed on a side of the second electrode distal from the second base substrate, wherein an orientation of the first alignment layer and an orientation of the second alignment layer are perpendicular to each other;
the method comprising:
categorizing the plurality of first electrodes into odd-numbered electrodes and even-numbered electrodes in a direction pointing to surroundings from the center, by taking the first electrode disposed at the center as an odd-numbered electrode, the odd-numbered electrodes and the even-numbered electrodes being alternately arranged one after another;
supplying a first threshold voltage to the first electrodes and a common voltage to the second electrode in response to the liquid crystal lens being in a non-operating state; and
supplying the first threshold voltage to the odd-numbered electrodes, a second threshold voltage to the even-numbered electrodes and a common voltage to the second electrode in response to the liquid crystal lens being in an operating state, the second threshold voltage being greater than the first threshold voltage.

18. The method for driving the liquid crystal lens according to claim 17, wherein supplying the second threshold voltage to the even-numbered electrodes comprises:
gradually increasing the second threshold voltage supplied to the even-numbered electrodes in a direction pointing to the surroundings at the center.

19. The method for driving the liquid crystal lens according to claim 17, wherein the liquid crystal layer comprises a plurality of liquid crystal molecules, and the first threshold voltage is n times a threshold voltage for driving the liquid crystal molecules to deflect, n being a positive integer, $2 \leq n \leq 4$.

20. The method for driving the liquid crystal lens according to claim 17, wherein the liquid crystal layer comprises a plurality of liquid crystal molecules, and the second threshold voltage is m times a threshold voltage for driving the liquid crystal molecules to deflect, $4 < m \leq 10$.

* * * * *